United States Patent [19]

Owens

[11] Patent Number: 4,520,655
[45] Date of Patent: Jun. 4, 1985

[54] VALVE TESTING APPARATUS

[75] Inventor: Ester L. Owens, Houston, Tex.

[73] Assignee: Gordon E. Eldridge, Friendswood, Tex. ; a part interest

[21] Appl. No.: 331,994

[22] Filed: Dec. 18, 1981

[51] Int. Cl.³ ............................................. G01M 3/28
[52] U.S. Cl. ........................................ 73/46; 73/49.8
[58] Field of Search ................................... 73/46, 49.8

[56] References Cited

U.S. PATENT DOCUMENTS

| | | | |
|---|---|---|---|
| 1,298,236 | 3/1919 | McKenzie | 73/46 |
| 1,373,824 | 4/1921 | McKenzie | 73/46 X |
| 1,467,813 | 9/1923 | Rahm | 73/49.8 |
| 1,571,958 | 2/1926 | Mueller et al. | 73/46 |
| 2,426,406 | 8/1947 | Meyers | 73/46 X |
| 2,934,942 | 5/1960 | Carrie | 73/46 |
| 2,934,943 | 5/1960 | Carrie | 73/46 |

Primary Examiner—S. Clement Swisher
Assistant Examiner—Joseph W. Roskos
Attorney, Agent, or Firm—Neal J. Mosely

[57] ABSTRACT

A fluid test apparatus for high pressure valves consists of a massive rigid supporting frame having a supporting table portion with an opening for application of fluid pressure to a valve being tested and an end sealing arrangement for sealing one opening to such valve. A pair of fluid operated cylinders are positioned on opposite sides of the supporting table and have extended pistons operable to be retracted upon application of fluid pressure to the cylinders. A clamping bar extends between the ends of the pistons and supports an end closure and seal for closing another opening to the valve being tested. A control system is associated with the apparatus to control the application of fluid pressure to the cylinders to retract the pistons to clamp and seal a valve being tested, and to control the application of fluid pressure to such valve in either open or closed position to test both the valve and the valve body for leakage. The apparatus may be constructed to support a valve for testing in either a vertical or a horizontal position. In the horizontal test apparatus, an additional fluid operated table is provided to position the valve being testing in proper relation to the supporting table and the operating cylinders. The apparatus includes end sealing arrangements for testing flanged valve bodies and valve bodies without flanges.

15 Claims, 9 Drawing Figures

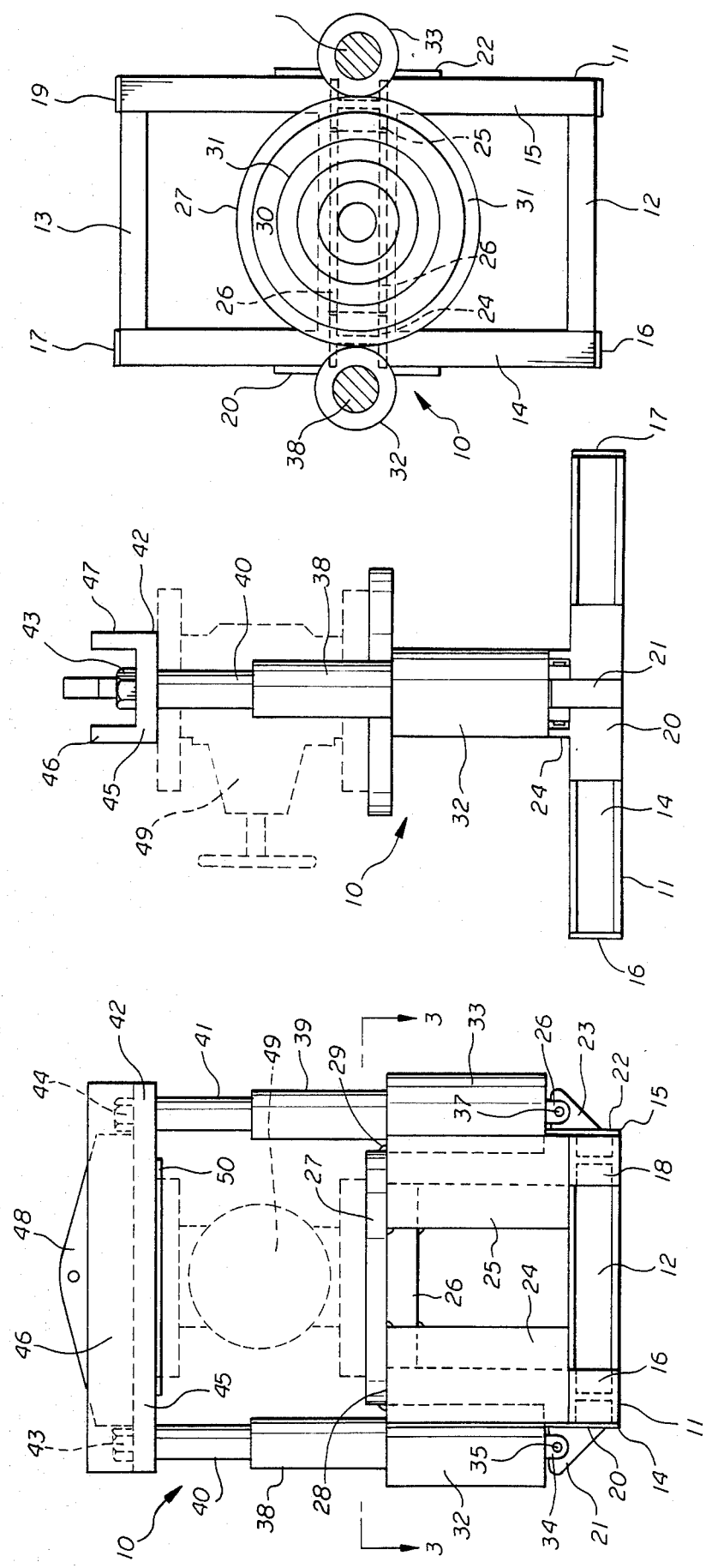

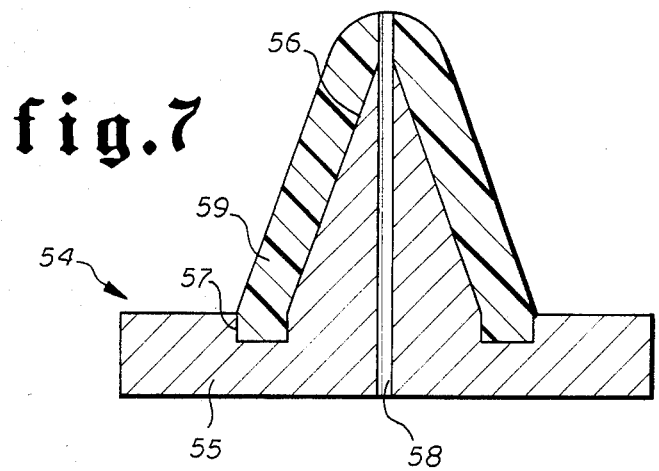
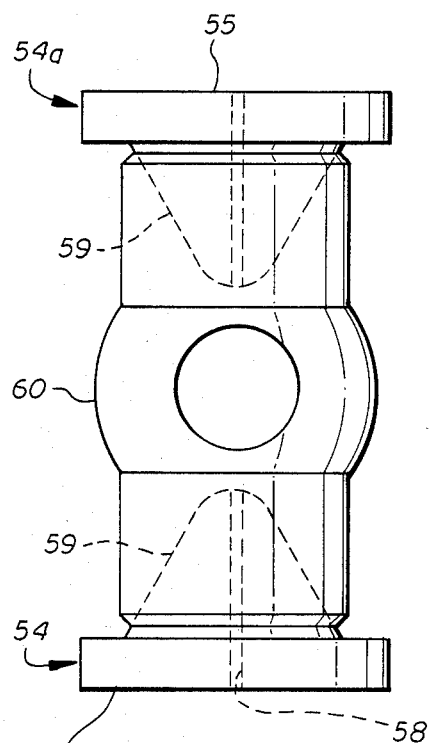
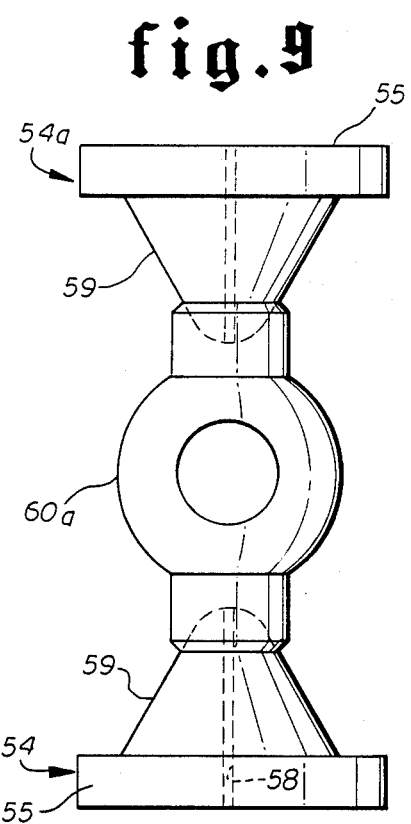

VALVE TESTING APPARATUS

BACKGROUND OF THE INVENTION

1. Field of the Invention

This invention relates to new and useful improvements in testing apparatus for high pressure valves.

2. Description of the Prior Art

A number of hydraulic test racks are available commercially for testing high pressure valves. Most of these, however, are very expensive and the market for them has been very limited. Also, the test racks which have been available commercially have design features which are not completely safe and can result in a valve slipping out of the rack during testing. In addition, many of the test racks are of a design which may fail during operation. Test racks of present commercial design are also not sufficiently versatile for testing both flanged valve bodies and valve bodies without flanges. As a result of these many deficiencies in the test racks presently available, many companies which have a substantial need to test high pressure valves used in their operations do not own test equipment and rely instead on more expensive testing service companies.

SUMMARY OF THE INVENTION

One of the objects of this invention is to provide a new and improved fluid operated test apparatus for fluid testing of high pressure valves.

Another object of this invention is to provide a new and improved apparatus for fluid testing of high pressure valve which is relatively inexpensive to manufacture and use.

Another object of this invention is to provide a new and improved apparatus for fluid testing of high pressure valves, both of the flanged body type and the type without valve body flanges.

Still another object of this invention is to provide a new and improved apparatus for fluid testing of high pressure valves which is safe in operation and does have the danger of the valve being tested slipping out during testing.

Still another object of this invention is to provide a new and improved apparatus for fluid testing of high pressure valves including a fluid operated clamping arrangement of improved design.

Yet another object of this invention is to provide a new and improved apparatus for fluid testing of high pressure valves having an improved pressure operated clamping mechanism of improved strength in design.

Yet another object of this invention is to provide a new and improved apparatus for fluid testing of high pressure valves having an improved system of control for application of both clamping pressure and testing pressure.

Another object of this invention is to provide a new and improved apparatus for fluid testing of high pressure valves having interchangable sealing arrangements permitting the testing of either flanged valve bodies or valve bodies without flanges.

Other objects of this invention will be apparent from time to time throughout the specification and claims as hereinafter related.

The above noted objects, as well as other objects of the invention are accomplished by a fluid test apparatus for high pressure valves which consists of a massive rigid supporting frame having a supporting table portion with an opening for application of fluid pressure to a valve being tested and an end sealing arrangement for sealing one opening to such valve.

A pair of fluid operated cylinders are positioned on opposite sides of the supporting table and have extended pistons operable to be retracted upon application of fluid pressure to the cylinders. A clamping bar extends between the ends of the pistons and supports an end closure and seal for closing another opening to the valve being tested.

A control system is associated with the apparatus to control the application of fluid pressure to the cylinders to retract the pistons to clamp and seal a valve being tested, and to control the application of fluid pressure to such valve in either open or closed position to test both the valve and the valve body for leakage.

The apparatus may be constructed to support a valve for testing in either a vertical or a horizontal position. In the horizontal test apparatus, an additional fluid operated table is provided to position the valve being tested in proper relation to the supporting table and the operating cylinders. The apparatus includes end sealing arrangements for testing flanged valve bodies and valve bodies without flanges.

BRIEF DESCRIPTION OF THE DRAWINGS

FIG. 1 is a view in front elevation of one of the preferred embodiments of high pressure test apparatus for valves in accordance with this invention.

FIG. 2 is a view in side elevation of the test apparatus shown in FIG. 1.

FIG. 3 is a sectional view of the apparatus taken on the line 3—3 of FIG. 1.

FIG. 7 is a view in longitudinal section of an end seal for use in the apparatus for testing of flangeless valves.

FIG. 8 is a plan view of the end seals of FIG. 7 assembled to test a flangeless valve of large diameter.

FIG. 9 is a plan view of the end seals of FIG. 7 assembled to test a flangeless valve of small diameter.

DESCRIPTION OF A PREFERRED EMBODIMENT

Figure 4:
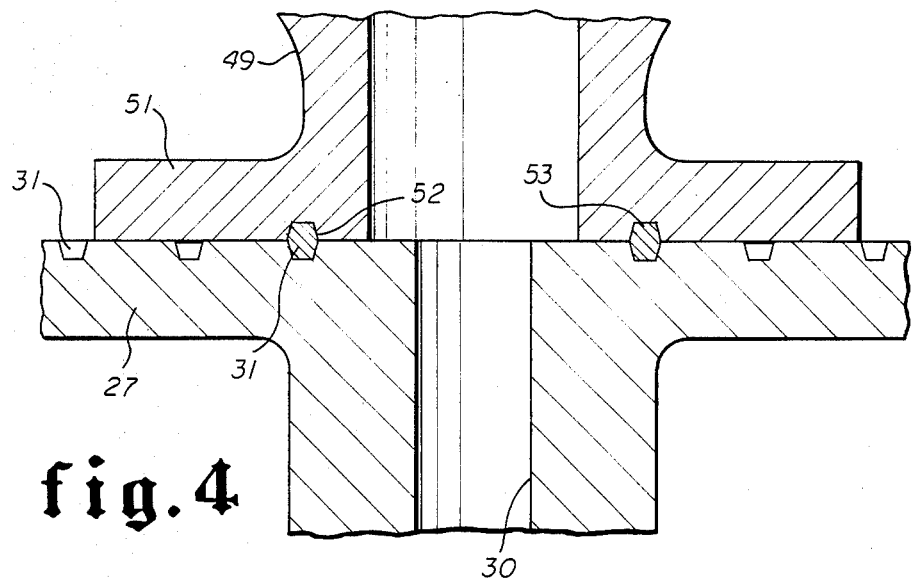
FIG. 4 is a detail sectional view showing the sealing of a valve flange in the test apparatus.

Referring to the drawings by numerals of reference and more particularly to FIGS. 1 to 4, there is shown a preferred embodiment of this invention in the form of a valve test apparatus 10. The valve test apparatus 10 comprises a rectangular support or base 11 consisting of a pair of laterally extending I-beams 12 and 13 and a pair of longitudinally extending I-beams 14 and 15 welded together into a unitary supporting structure or pad. The ends of I-beam 14 are closed off by plates 16 and 17 welded on opposite ends thereof. Similarly I-beam 15 has end plates 18 and 19 welded to opposite ends thereof.

A reinforcing plate 20 is welded to I-beam 14 in the middle section thereof. Plate 20 is provided with a massive supporting ear 21 for a fluid operated cylinder which will be subsequently described. Likewise, a reinforcing plate 22 is welded to the middle section of I-beam 15 and has a supporting ear 23 thereon for another fluid operated cylinder.

At the middle of supporting base 11, there is provided a supporting pedestal which consists of upwardly extending I-beams 24 and 25 which are welded at the bottom to I-beams 14 and 15. A pair of flat, reinforcing bars 26 are positioned between the upper ends of vertically extending I-beams 24 and 25 and are welded thereto to provide a rigid pedestal support for the test table of the valve test apparatus. Test table 27 is welded to I-beam 24 as indicated at 28 and to I-beam 25 as indicated at 29. Test table 27 is a thick plate of steel which is disc shaped and has a center opening 30 for application of hydraulic pressure and a plurality of grooves 31 which are API standard grooves for matching the flanges of an API valve.

On opposite sides of the apparatus, there are provided a pair of operating cylinders 32 and 33 which are hydraulically operated for applying a clamping force to a valve being tested in the apparatus. Bottom of cylinder 32 is provided with a yoke 34 which fits over ear 21 and is secured by a pin 35. Likewise, cylinder 33 is provided with a yoke 36 fitting over ear 23 and secured by pin 37. Cylinders 32 and 33 are provided with operating pistons 38 and 39, respectively, which may be single pistons or, as shown in FIG. 1, may be compound pistons having telescoping portions 40 and 41.

The upper ends of the pistons fit into a clamping bar 42 and are secured by nuts 43 and 44. Clamping bar 42 is channel shaped with a base portion 45 and upwardly extending side braces 46 and 47. An additional brace 48 is secured to the base portion 45 and extends between the ends of the clamping bar adjacent to nuts 43 and 44. The reinforcing bars 46, 47 and 48 provide the necessary stiffness to prevent deformation when the apparatus is clamped hydraulically onto a valve being tested. The clamping bar 42 is movable by pistons 38 and 39 being retracted by hydraulic cylinders 32 and 33.

In FIGS. 1 and 2, a valve 49 is shown in dotted line clamped in position to be tested in the apparatus. Valve 49 is clamped against table 27 at the bottom and clamping plate 50 at the top. In FIG. 4, there is shown a detail, sectional view of the seal between supporting table 27 and the flange of the valve 49 being tested. The flange 51 of valve 49 is shown with a sealing groove 52 matching one of the grooves 31 in table 37 and having a sealing ring 53 secured therein. Opening 30 through the base of table 27 provides for the introduction of hydraulic fluid for testing valve 49. Supporting plate 50 at the upper end of the apparatus has a similar arrangement of API grooves to provide a seal on the opposite side of valve 49.

In FIGS. 7-9, there is shown a modified support or adaptor for use with the apparatus and the testing of flangeless, i.e. butt-welded, valve. Adaptor 54 consists of a steel disc shaped member 55 having a conical extension 56 surrounded by a groove 57 and having a passage or opening 58 extending longitudinally therethrough. A conical sleeve 59 of relatively hard rubber surrounds conical extension 56 and fits into groove 57. Passage 58 extends through the tip of conical rubber sleeve 59. The complete adaptor 54 is therefore a disc shaped member having a conical projection with a rounded end. One of the adaptors 54 is used on the side of the valve to which pressure is to be applied. An identical adaptor, lacking the passage 58 is provided for closing and sealing off the other side of the valve. This modified adaptor is referred to as 54a in FIGS. 8 and 9.

In FIG. 8, adaptor 54 and adaptor 54a are shown inserted into opposite sides of flangeless valve 60 for testing. Adaptor 54a seals off one side of the valve, while opening 58 in adaptor 54 provides for an inlet for introduction of water under pressure for testing the valve. The embodiment shown in FIG. 8 is one in which valve 60 is of a relatively large diameter and the openings engage the rubber surface 59 of adaptors 54 and 54a relatively close to the supporting disc portion 55. In FIG. 9, the same arrangement is shown except that valve 60a is of a substantially smaller diameter and engages the rubber sleeves 59 of adaptors 54 and 54a near the projecting end portions thereof.

DESCRIPTION OF AN ALTERNATE EMBODIMENT

Figure 5:
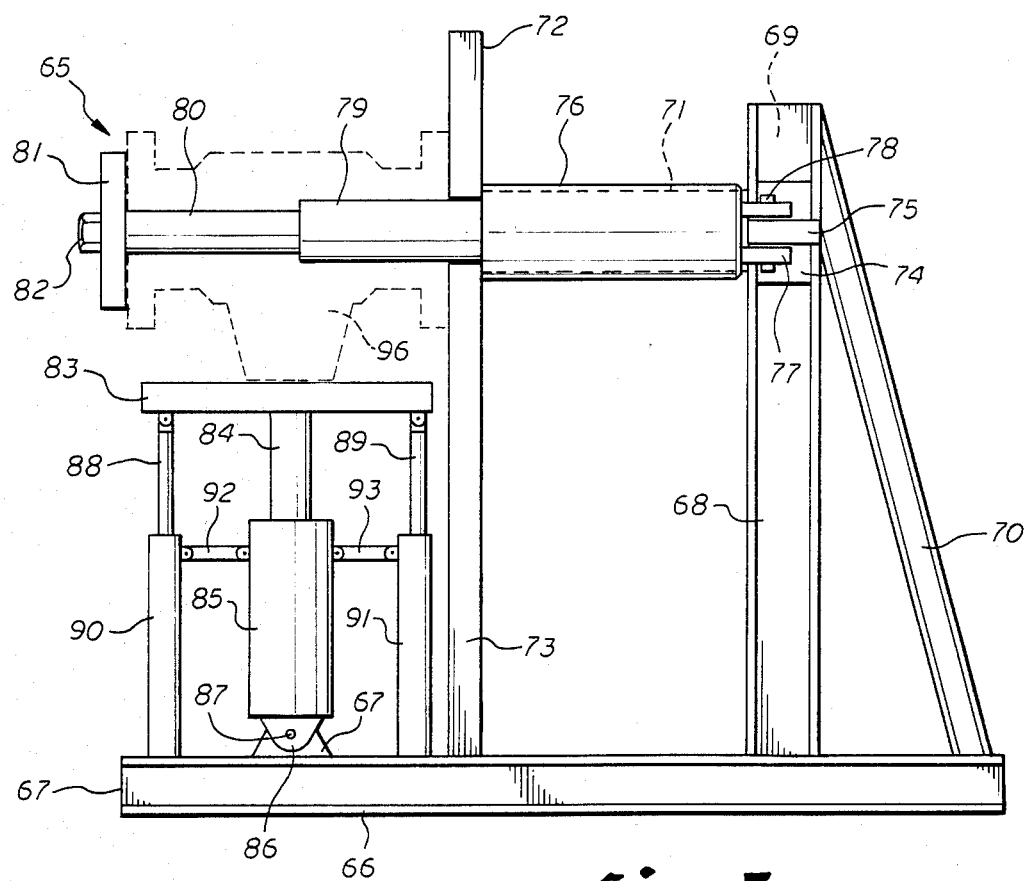
FIG. 5 is a view in front elevation of another embodiment of the test apparatus in which the valves being tested are supported in a horizontal position.

In FIG. 5, there is shown an alternate embodiment of the test apparatus in which the test table and clamping cylinders are positioned to support the valve being tested in a horizontal position.

In this embodiment, the test apparatus 65 has a rectangular base frame work support 66 in a form of a plurality of I-beams 67 welded together substantially as in FIG. 3. A pair of vertically extending supports in the form of I-beams 68 are welded to the base I-beams 67 and supported by a cross I-beam 69 welded thereto at the top. A pair of I-beam braces 70 are welded to vertically extending I-beams 68 and I-beams 67 of the supporting pad or framework. A pair of I-beams 71 extend outward from and are welded to vertically extending I-beams 68 at one end and at the other end are welded to test table 72 which corresponds to test table 27 in FIG. 1. A pair of supporting bars 73 are welded to I-beams 67 of the supporting base or pad and are welded at the top of test table 72 to support the same in place.

Vertically extending I-beams 68 have reinforcing plates 74 welded thereon which include outwardly projecting ears 75. The apparatus is provided with a pair of fluid operated cylinders 76 having yoke 77 at the base thereof secured to ears 75 by retaining pins 78. Cylinders 76 function to operate a piston 79 which may be a single piston or may be a compound piston including extension 80. The outer ends of pistons 79 (and 80) extend through clamping bar 81 and are secured thereto by nuts 82.

The test apparatus 65 has a supporting table 83 for supporting valves being tested in proper relation to the supporting table 72. Supporting table 83 is operated by piston 84 which is operated by cylinder 85. Cylinder 85 is connected by a yoke 86 and pin 87 to a supporting ear on support I-beam 67. Vertical table 83 is provided with a pair of vertical guide rods 88 and 89 which slide in cylinders 90 and 91. Cylinder 85 is tied to supporting cylinder guides 90 and 91 by tie rods 92 and 93.

In the embodiment shown in FIG. 5, a valve 96 is shown supported on table 83 and API test table 72 clamped in position for application of water under pressure for testing the valve and the valve body.

THE CONTROL SYSTEM FOR THE APPARATUS

Figure 6:
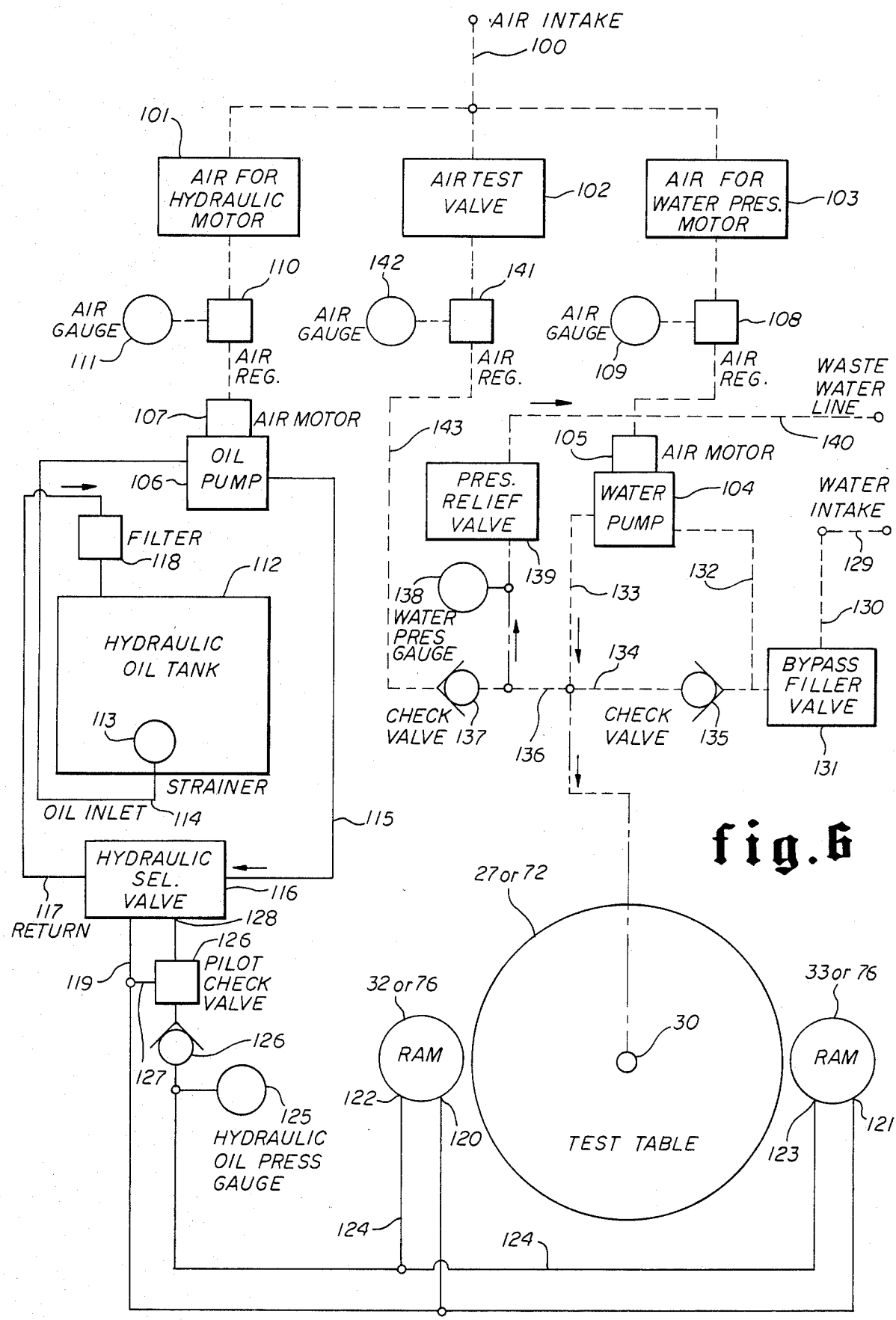
FIG. 6 is a schematic diagram for the control system associated with the apparatus of FIG. 1 or FIG. 5.

In FIG. 6, there is shown a schematic drawing or flow diagram for the water, air and oil used in controlling the various components of the test apparatus.

Compressed air from an air intake 100 is connected to control valve 101 controlling the supply of air to a hydraulic motor; control valve 102 controlling the supply of air to test table 27 (or 72); and valve 103 controlling the supply of air to a water pressure motor or pump.

The apparatus includes a water pump 104 operated by an air motor 105 which provides water at a high pressure to the test table 27 (or 72) for testing valves thereon. The system also includes a hydraulic motor or oil pump 106 which is driven by an air motor 107 and provides oil (or other hydraulic fluid under pressure for operating the clamping rams 32 and 33 (or 76).

The flow of air from the compressed air intake 100 to air motor 105 for water pump 104 is controlled by valve 103. The air passing through valve 103 passes through air regulator 108 which is connected to air gauge 109 registering the amount of air pressure. Likewise, the air from intake 100 passes through control valve 101 and air regulator 110 (connected to air gauge 111) and thence to air motor 107 for operating hydraulic motor or oil pump 106 for supply of hydraulic fluid under pressure.

Hydraulic fluid, i.e. oil, is supplied from tank 112 through strainer 113 and line 114 leading to the inlet side of oil pump 106. From the outlet side of hydraulic pump or motor 106, line 115 leads to the inlet side of hydraulic selector valve 116. One of the outlets from valve 116 is connected to return line 117 extending to filter 118 which is connected back to hydraulic tank 112.

Another outlet of valve 116 is connected to line 119 which is connected at 120 to one side of ram cylinder 32 and at 121 to one side of ram cylinder 33. The other side 122 of ram cylinder 32 and one side 123 of ram cylinder 33 are connected to line 124 leading back to selector valve 116. Line 124 is connected to hydraulic oil pressure gauge 125 and to one side of pilot check valve 126. Pilot check valve is provided with operating pressure by connection 127 to line 119 and is connected back to hydraulic selector valve as indicated 128.

Water for testing valves in the test apparatus is supplied from a suitable source to intake 129 connected to line 130 leading to bypass filler valve 131. Filler valve 131 is connected by line 132 to inlet side of pump 104. From the outlet side of pump 104 connected to line 133 leading to the opening 130 in test table 27 for application of water under pressure to a valve being tested. Line 133 is connected by line 134 to check valve 135 which is connected to line 132 on the outlet side of bypass filler valve 131. Line 133 is also connected by line 136 to check valve 137. Line 136 is also connected to water pressure gauge 138 and to pressure relief valve 139, the outlet side of which is connected to waste water line 140.

Compressed air from air intake 100 is introduced through air test valve 102 to air regulator 141 which is also connected to air pressure gauge 142. The outlet side of air regulator 141 is connected to line 143 leading to check valve 137.

OPERATION

In operation, valve 49, which is to be tested, is placed in the apparatus after operating the cylinders 32 and 33 to move clamping bar 46 to a sufficiently open position. Cylinders 32 and 33 are operated by application of hydraulic pressure to one side to open and to the other side to close.

When the apparatus is turned on, the air for operating the oil pump 106 is supplied by operating of control valve 101 to permit air flow to air motor 107. The air pressure applied is adjusted by regulator 110 to the desired value as registered on gauge 111.

The operation of oil pump 106 draws oil from tank 112 through strainer 113 and supplies it under the desired pressure to hydraulic selector valve 116. Selector valve 116 is moved to one position to permit flow to one side of cylinders or rams 32 and 33 to move them to the open position. One movement to another position, selector valve 116 directs oil pressure to the other side of the rams or cylinders to retract the operating pistons to clamp the valve in place. The closing or clamping movement is controlled through pilot check valve 126. The hydraulic pressure is indicated on gauge 125. When the selector valve 116 is in the off position, the oil is returned through line 117 to the oil tank 112.

The clamping action of cylinders or rams 32 and 33 by retracting the pistons and clamping bar 46 clamps valve 49 in place with the bottom flange sealed as shown in FIG. 4. This clamps the valve tightly without danger of it slipping out when water pressure is applied as is possible with some prior art designs.

With the valve 49 clamped tightly in the apparatus, the valve can then be tested under water- or air-pressure. Control valve 103 is operated to permit air flow through regulator 108 (the the pressure indicated on gauge 109) to air motor 105 which drives water pump 104. Water from intake 129 enters through bypass filler valve and is pumped by pump 104 to opening 30 to apply pressure the the valve 49.

Valve 49 is first tested with the gate (or ball or plug) closed to test for leakage through the valve. Then, the valve is opened and the water pressure applied further to test the valve body for leakage. Check valve 135 prevents back flow into the pump 104 during filling. Check valve 137 prevents backflow of water into the air system. Water pressure is indicated on gauge 138 and excess pressure is released through pressure relief valve 139 to waste water line 140.

The valve may be air-tested with compressed air supplied through the control valve 102 to regulator 141 and gauge 142. This compressed air is supplied when the water is turned off and passes through check valve 137 to testable opening 30.

The operation of the apparatus shown in FIG. 7–9 is the same as just described except that the adaptors 54 and 54a are used to seal the inlet and outlet of valve 60 or 60a.

The operation of the apparatus shown in FIG. 5 is the same as that described for the other embodiments. Valve 96, however, is raised by table 83 into alignment with table 72 by hydraulic cylinder 85 which is controlled by a separate hydraulic circuit (not shown) which can be manually adjusted.

While this invention has been fully and completely described with reference to several preferred embodiments, it should be understood that within the scope of the appended claims the invention may be practiced otherwise than as specifically set forth herein.

I claim:

1. An apparatus for fluid testing high pressure valves comprising a rigid supporting base, a test table supported on said base, having a central opening for application of fluid pressure and API grooves in the supporting face thereof for sealing one opening of a valve being tested, a pair of fluid operated cylinders positioned on opposite sides of said test table and supported on said base, a pair of pistons, one in each of said cylinders, for application of compressive force by retraction thereof under fluid pressure, a clamping bar extending between and supported on the ends of said pistons, and adapted to support a closure plate for supporting and sealing another opening of a valve being tested, controllable means for supplying fluid pressure to said test table opening, comprising a hydraulic fluid reservoir, a hydraulic fluid pump having an inlet connected to said reservoir, a selector valve having an inlet connected to the outlet of said hydraulic fluid pump and a plurality of outlets, one of said selector valve outlets being connected to said reservoir, another of said selector valve outlets being connected to one side of each of said cylinders, and another of said selector valve outlets being connected to the other side of each of said cylinders, and controllable means for supplying fluid pressure to said cylinders for clamping a valve to be tested between said clamping bar and said test table.

2. A valve testing apparatus according to claim 1 in which said apparatus is vertically oriented with said test table supported in a horizontal position.

3. A valve testing apparatus according to claim 1 in which said apparatus is horizontally oriented with said test table supported in a vertical position.

4. A valve testing apparatus according to claim 2 in which said base comprises a supporting pad of rectangular configuration formed of welded steel beams and a pedastle comprising steel beams welded thereto and extending vertically therefrom, said test table being welded to the upper ends for said pedastle beams.

5. A valve testing apparatus according to claim 4 in which said clamping bar comprises a flat elongated bar with a plurality of reinforcing bars extending longitudinally thereof and normal to the plane of said bar, and including a removable supporting plate for closing the other opening of a valve being tested whereby retraction of said pistons by fluid pressure applies a force to clamp the valve being tested against said supporting table.

6. A valve testing apparatus according to claim 3 in which said base comprises a supporting pad of rectangular configuration formed of welded steel beams and a pedastle comprising steel beams welded thereto and extending vertically therefrom, a pair of horizontally extending supporting beams welded to the upper ends of said pedastle beams, and said test table being welded to the outer ends of said horizontally extending beams, a vertically extending beam welded at one end to said supporting pad and at the other end to said test table to support the same, a horizontally extending supporting table positioned in front of said test table, and a fluid operated cylinder positioned under said supporting table and having a piston secured to and supporting the same and operable to move said supporting table to position a valve being tested in alignment with said test table opening and said clamping bar.

7. A valve testing apparatus according to claim 4 or claim 6 including a pair of adaptors for sealing the openings of flangeless valves for testing, said adaptors each having a disc shaped base with a conical projection extending laterally therefrom, said conical projections each having a rubber conical sleeve thereon operable to form a seal with the openings of a flangeless valve for high pressure testing thereof, and one of said adaptors having a passage extending through said base and said conical projection and sleeve for application of fluid pressure from the opening of said test table, and the other adaptor having no opening, thus being operable to seal the other opening of a flangeless valve when supported by said clamping bar.

8. A valve testing apparatus according to claim 1 in which said test table fluid supply controllable means comprises a water pump having an outlet connected to said test table and operable to supply water under pressure thereto, a filler valve having an inlet for connection to a water supply and an outlet connected to the inlet of said water pump, and including valve means connectable to a source of compressed air and operatively connected to said test table for controlling the application of air pressure thereto.

9. A valve testing apparatus according to claim 1 or claim 8 in which said air pressure controlling valve is connected to each of said air motors to control the operation of said pumps.

10. An apparatus for fluid testing high pressure valves comprising a rigid supporting base, a test table supported on said base, having a central opening for application of fluid pressure and API grooves in the supporting face thereof for sealing one opening of a valve being tested, a pair of flumd operated cylinders positioned on opposite sides of said test table and supported on said base, a pair of pistons, one in each of said cylinders, for application of compressive force by retraction thereof under fluid pressure, a clamping bar extending between and supported on the ends of said pistons, and adapted to support a closure plate for supporting and sealing another opening of a valve being tested, a pair of adaptors for sealing the openings of flangeless valves for testing, said adaptors each having a disc shaped base with a conical projection extending laterally therefrom, said conical projections each having a rubber conical sleeve thereon operable to form a seal with the openings of a flangeless valve for high pressure testing thereof, and one of said adaptors having a passage extending through said base and said conical projection and sleeve for application of fluid pressure from the opening of said test table, and the other adaptor having no opening, thus being operable to seal the other opening of a flangeless valve when supported by said clamping bar.

11. A valve testing apparatus according to claim 10 in which
said apparatus is vertically oriented with said test table supported in a horizontal position.

12. A valve testing apparatus according to claim 10 in which
said apparatus is horizontally oriented with said test table supported in a vertical position.

13. A valve testing apparatus according to claim 11 in which
said base comprises a supporting pad of rectangular configuration formed of welded steel beams and a pedastle comprising steel beams welded thereto and extending vertically therefrom,
said test table being welded to the upper ends for said pedastle beams.

14. A valve testing apparatus according to claim 13 in which
said clamping bar comprises a flat elongated bar with a plurality of reinforcing bars extending longitudinally thereof and normal to the plane of said bar, and including a removable supporting plate for closing the other opening of a valve being tested whereby retraction of said pistons by fluid pressure applies a force to clamp the valve being tested against said supporting table.

15. A valve testing apparatus according to claim 12 in which
said base comprises a supporting pad of rectangular configuration formed of welded steel beams and a pedastle comprising steel beams welded thereto and extending vertically therefrom,
a pair of horizontally extending supporting beams welded to the upper ends of said pedastle beams, and
said test table being welded to the outer ends of said horizontally extending beams,
a vertically extending beam welded at one end to said supporting pad and at the other end to said test table to support the same,
a horizontally extending supporting table positioned in front of said test table, and
a fluid operated cylinder positioned under said supporting table and having a piston secured to and supporting the same and operable to move said supporting table to position a valve being tested in alignment with said test table opening and said clamping bar.

* * * * *